US011816123B2

(12) United States Patent
Crawford, Jr. et al.

(10) Patent No.: US 11,816,123 B2
(45) Date of Patent: *Nov. 14, 2023

(54) DATA TRANSFER WITH A BIT VECTOR OPERATION DEVICE

(71) Applicant: Micron Technology, Inc., Boise, ID (US)

(72) Inventors: Isom Crawford, Jr., Royse City, TX (US); Graham Kirsch, Tadley (GB); John D. Leidel, McKinney, TX (US)

(73) Assignee: Micron Technology, Inc., Boise, ID (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/199,261

(22) Filed: Mar. 11, 2021

(65) Prior Publication Data

US 2021/0200783 A1 Jul. 1, 2021

Related U.S. Application Data

(63) Continuation of application No. 15/048,179, filed on Feb. 19, 2016, now Pat. No. 10,956,439.

(51) Int. Cl.
  *G06F 16/83* (2019.01)
  *G06F 16/25* (2019.01)
  *H04L 67/1097* (2022.01)

(52) U.S. Cl.
  CPC ........ *G06F 16/258* (2019.01); *H04L 67/1097* (2013.01)

(58) Field of Classification Search
  None
  See application file for complete search history.

(56) References Cited

U.S. PATENT DOCUMENTS

| 4,380,046 A | 4/1983 | Fung |
| 4,435,792 A | 3/1984 | Bechtolsheim |
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |

(Continued)

FOREIGN PATENT DOCUMENTS

| CN | 1077832 | 10/1993 |
| CN | 1122475 | 5/1996 |

(Continued)

OTHER PUBLICATIONS

Office Action for related China Patent Application No. 201780012224. 6, dated Jan. 13, 2021, 17 pages.

(Continued)

*Primary Examiner* — Thu N Nguyen
(74) *Attorney, Agent, or Firm* — Brooks, Cameron & Huebsch, PLLC

(57) ABSTRACT

Examples of the present disclosure provide apparatuses and methods for direct data transfer. An example method comprises transferring data between a first device and a second device, wherein the first device is a bit vector operation device, and transforming the data using a data transform engine (DTE) by rearranging the data to enable the data to be stored on the first device when transferring the data between the second device and first memory device.

20 Claims, 6 Drawing Sheets

(56) References Cited

U.S. PATENT DOCUMENTS

| | | |
|---|---|---|
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,251,207 A | 10/1993 | Abensour et al. |
| 5,253,308 A | 10/1993 | Johnson |
| 5,276,643 A | 1/1994 | Hoffman et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,416,907 A | 5/1995 | Polzin et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,941,980 A | 8/1999 | Shang et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,122,498 A | 9/2000 | Sipila |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 3,042,082 A1 | 10/2011 | Solomon |
| 8,045,391 B2 | 10/2011 | Mokhlesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,531,902 B2 | 9/2013 | Jung et al. |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,838,899 B2 | 9/2014 | Walker |
| 8,873,272 B2 | 10/2014 | Lee |
| 8,964,496 B2 | 2/2015 | Manning |

(56) References Cited

U.S. PATENT DOCUMENTS

| | | | |
|---|---|---|---|
| 8,971,124 B1 | 3/2015 | Manning | |
| 9,015,390 B2 | 4/2015 | Klein | |
| 9,047,193 B2 | 6/2015 | Lin et al. | |
| 9,165,023 B2 | 10/2015 | Moskovich et al. | |
| 2001/0007112 A1 | 7/2001 | Porterfield | |
| 2001/0008492 A1 | 7/2001 | Higashiho | |
| 2001/0010057 A1 | 7/2001 | Yamada | |
| 2001/0028584 A1 | 10/2001 | Nakayama et al. | |
| 2001/0043089 A1 | 11/2001 | Forbes et al. | |
| 2002/0059355 A1 | 5/2002 | Peleg et al. | |
| 2003/0167426 A1 | 9/2003 | Slobodnik | |
| 2003/0222879 A1 | 12/2003 | Lin et al. | |
| 2004/0073592 A1 | 4/2004 | Kim et al. | |
| 2004/0073773 A1 | 4/2004 | Demjanenko | |
| 2004/0085840 A1 | 5/2004 | Vali et al. | |
| 2004/0095826 A1 | 5/2004 | Perner | |
| 2004/0154002 A1 | 8/2004 | Ball et al. | |
| 2004/0205289 A1 | 10/2004 | Srinivasan | |
| 2004/0240251 A1 | 12/2004 | Nozawa et al. | |
| 2005/0015557 A1 | 1/2005 | Wang et al. | |
| 2005/0078514 A1 | 4/2005 | Scheuerlein et al. | |
| 2005/0097417 A1 | 5/2005 | Agrawal et al. | |
| 2006/0043312 A1 | 3/2006 | Siebert et al. | |
| 2006/0047937 A1 | 3/2006 | Selvaggi et al. | |
| 2006/0069849 A1 | 3/2006 | Rudelic | |
| 2006/0133483 A1 | 6/2006 | Park et al. | |
| 2006/0146623 A1 | 7/2006 | Mizuno et al. | |
| 2006/0149804 A1 | 7/2006 | Luick et al. | |
| 2006/0181917 A1 | 8/2006 | Kang et al. | |
| 2006/0215432 A1 | 9/2006 | Wickeraad et al. | |
| 2006/0225072 A1 | 10/2006 | Lari et al. | |
| 2006/0291282 A1 | 12/2006 | Liu et al. | |
| 2007/0073935 A1 | 3/2007 | Kim et al. | |
| 2007/0103986 A1 | 5/2007 | Chen | |
| 2007/0171747 A1 | 7/2007 | Hunter et al. | |
| 2007/0180006 A1 | 8/2007 | Gyoten et al. | |
| 2007/0180184 A1 | 8/2007 | Sakashita et al. | |
| 2007/0195602 A1 | 8/2007 | Fong et al. | |
| 2007/0285131 A1 | 12/2007 | Sohn | |
| 2007/0285979 A1 | 12/2007 | Turner | |
| 2007/0291532 A1 | 12/2007 | Tsuji | |
| 2008/0025073 A1 | 1/2008 | Arsovski | |
| 2008/0037333 A1 | 2/2008 | Kim et al. | |
| 2008/0052711 A1 | 2/2008 | Forin et al. | |
| 2008/0137388 A1 | 6/2008 | Krishnan et al. | |
| 2008/0140750 A1* | 6/2008 | Kershaw | G06F 9/3885 712/E9.016 |
| 2008/0165601 A1 | 7/2008 | Matick et al. | |
| 2008/0178053 A1 | 7/2008 | Gorman et al. | |
| 2008/0215937 A1 | 9/2008 | Dreibelbis et al. | |
| 2009/0067218 A1 | 3/2009 | Graber | |
| 2009/0154238 A1 | 6/2009 | Lee | |
| 2009/0154273 A1 | 6/2009 | Borot et al. | |
| 2009/0254697 A1 | 10/2009 | Akerib | |
| 2010/0067296 A1 | 3/2010 | Li | |
| 2010/0091582 A1 | 4/2010 | Vali et al. | |
| 2010/0091658 A1 | 4/2010 | Nguyen et al. | |
| 2010/0172190 A1 | 7/2010 | Lavi et al. | |
| 2010/0210076 A1 | 8/2010 | Gruber et al. | |
| 2010/0226183 A1 | 9/2010 | Kim | |
| 2010/0308858 A1 | 12/2010 | Noda et al. | |
| 2010/0312999 A1 | 12/2010 | Walker | |
| 2010/0318764 A1 | 12/2010 | Greyzck | |
| 2010/0332895 A1 | 12/2010 | Billing et al. | |
| 2011/0051523 A1 | 3/2011 | Manabe et al. | |
| 2011/0063919 A1 | 3/2011 | Chandrasekhar et al. | |
| 2011/0083064 A1 | 4/2011 | Kagan et al. | |
| 2011/0093662 A1 | 4/2011 | Walker et al. | |
| 2011/0103151 A1 | 5/2011 | Kim et al. | |
| 2011/0119467 A1 | 5/2011 | Cadambi et al. | |
| 2011/0122695 A1 | 5/2011 | Li et al. | |
| 2011/0140741 A1 | 6/2011 | Zerbe et al. | |
| 2011/0219260 A1 | 9/2011 | Nobunaga et al. | |
| 2011/0267883 A1 | 11/2011 | Lee et al. | |
| 2011/0317496 A1 | 12/2011 | Bunce et al. | |
| 2012/0005397 A1 | 1/2012 | Lim et al. | |
| 2012/0017039 A1 | 1/2012 | Margetts | |
| 2012/0023281 A1 | 1/2012 | Kawasaki et al. | |
| 2012/0110397 A1 | 5/2012 | Tanaka et al. | |
| 2012/0120705 A1 | 5/2012 | Mitsubori et al. | |
| 2012/0134216 A1 | 5/2012 | Singh | |
| 2012/0134226 A1 | 5/2012 | Chow | |
| 2012/0135225 A1 | 5/2012 | Chow | |
| 2012/0140540 A1 | 6/2012 | Agam et al. | |
| 2012/0182798 A1 | 7/2012 | Hosono et al. | |
| 2012/0195146 A1 | 8/2012 | Jun et al. | |
| 2012/0198310 A1 | 8/2012 | Tran et al. | |
| 2012/0246380 A1 | 9/2012 | Akerib et al. | |
| 2012/0265964 A1 | 10/2012 | Murata et al. | |
| 2012/0281486 A1 | 11/2012 | Rao et al. | |
| 2012/0303627 A1 | 11/2012 | Keeton et al. | |
| 2013/0003447 A1 | 1/2013 | Jung et al. | |
| 2013/0003467 A1 | 1/2013 | Klein | |
| 2013/0061006 A1 | 3/2013 | Hein | |
| 2013/0107623 A1 | 5/2013 | Kavalipurapu et al. | |
| 2013/0117541 A1 | 5/2013 | Choquette et al. | |
| 2013/0124783 A1 | 5/2013 | Yoon et al. | |
| 2013/0132702 A1 | 5/2013 | Patel et al. | |
| 2013/0138646 A1 | 5/2013 | Sirer et al. | |
| 2013/0163362 A1 | 6/2013 | Kim | |
| 2013/0173888 A1 | 7/2013 | Hansen et al. | |
| 2013/0205114 A1 | 8/2013 | Badam et al. | |
| 2013/0219112 A1 | 8/2013 | Okin et al. | |
| 2013/0227361 A1 | 8/2013 | Bowers et al. | |
| 2013/0238669 A1* | 9/2013 | Zhou | G06F 16/254 707/E17.005 |
| 2013/0283122 A1 | 10/2013 | Anholt et al. | |
| 2013/0286705 A1 | 10/2013 | Grover et al. | |
| 2013/0326154 A1 | 12/2013 | Haswell | |
| 2013/0332707 A1 | 12/2013 | Gueron et al. | |
| 2014/0185395 A1 | 7/2014 | Seo | |
| 2014/0215185 A1 | 7/2014 | Danielsen | |
| 2014/0250279 A1 | 9/2014 | Manning | |
| 2014/0344934 A1 | 11/2014 | Jorgensen | |
| 2015/0029798 A1 | 1/2015 | Manning | |
| 2015/0042380 A1 | 2/2015 | Manning | |
| 2015/0063052 A1 | 3/2015 | Manning | |
| 2015/0078108 A1 | 3/2015 | Cowles et al. | |
| 2015/0279466 A1 | 3/2015 | Manning | |
| 2015/0120987 A1 | 4/2015 | Wheeler | |
| 2015/0134713 A1 | 5/2015 | Wheeler | |
| 2015/0254804 A1 | 9/2015 | Hasegawa et al. | |
| 2015/0270015 A1 | 9/2015 | Murphy et al. | |
| 2015/0324290 A1 | 11/2015 | Leidel | |
| 2015/0324387 A1 | 11/2015 | Squires | |
| 2015/0325272 A1 | 11/2015 | Murphy | |
| 2015/0356009 A1 | 12/2015 | Wheeler et al. | |
| 2015/0356022 A1 | 12/2015 | Leidel et al. | |
| 2015/0357007 A1 | 12/2015 | Manning et al. | |
| 2015/0357008 A1 | 12/2015 | Manning et al. | |
| 2015/0357019 A1 | 12/2015 | Wheeler et al. | |
| 2015/0357020 A1 | 12/2015 | Manning | |
| 2015/0357021 A1 | 12/2015 | Hush | |
| 2015/0357022 A1 | 12/2015 | Hush | |
| 2015/0357023 A1 | 12/2015 | Hush | |
| 2015/0357024 A1 | 12/2015 | Hush et al. | |
| 2015/0357047 A1 | 12/2015 | Tiwari | |
| 2016/0098200 A1* | 4/2016 | Guz | G06F 11/30 711/154 |

FOREIGN PATENT DOCUMENTS

| | | |
|---|---|---|
| CN | 1169807 | 1/1998 |
| CN | 102141905 | 8/2011 |
| CN | 103620684 | 3/2014 |
| EP | 0214718 | 3/1987 |
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| TW | 201106373 | 2/2011 |
| WO | 2001065359 | 9/2001 |

(56) References Cited

FOREIGN PATENT DOCUMENTS

| WO | 2010079451 | 7/2010 |
|---|---|---|
| WO | 2010141221 | 12/2010 |
| WO | 2013062596 | 5/2013 |
| WO | 2013081588 | 6/2013 |
| WO | 2013095592 | 6/2013 |

OTHER PUBLICATIONS

Boyd et al., "On the General Applicability of Instruction-Set Randomization", Jul.-Sep. 2010, (14 pgs.), vol. 7, Issue 3, IEEE Transactions on Dependable and Secure Computing.

Stojmenovic, "Multiplicative Circulant Networks Topological Properties and Communication Algorithms", (25 pgs.), Discrete Applied Mathematics 77 (1997) 281-305.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

Debnath, Biplob, Bloomflash: Bloom Filter on Flash-Based Storage, 2011 31st Annual Conference on Distributed Computing Systems, Jun. 20-24, 2011, 10 pgs.

Pagiamtzis, Kostas, "Content-Addressable Memory Introduction", Jun. 25, 2007, (6 pgs.), retrieved from: http://www.pagiamtzis.com/cam/camintro.

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

International Search Report and Written Opinion for PCT Application No. PCT/US2013/043702, dated Sep. 26, 2013, (11 pgs.).

Elliot, et al., "Computational RAM: Implementing Processors in Memory", Jan.-Mar. 1999, (10 pgs.), vol. 16, Issue 1, IEEE Design and Test of Computers Magazine.

Dybdahl, et al., "Destructive-Read in Embedded DRAM, Impact on Power Consumption," Apr. 2006, (10 pgs.), vol. 2, Issue 2, Journal of Embedded Computing—Issues in embedded single-chip multicore architectures.

Kogge, et al., "Processing In Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for related PCT Application No. PCT/US2017/017919, dated May 29, 2017, 10 pages.

\* cited by examiner

DATA TRANSFER WITH A BIT VECTOR OPERATION DEVICE

PRIORITY INFORMATION

This application is a Continuation of U.S. application Ser. No. 15/048,179, filed Feb. 19, 2016, the contents of which are included herein by reference.

TECHNICAL FIELD

The present disclosure relates generally to semiconductor memory apparatuses and methods, and more particularly, to apparatuses and methods related to data transfer with a bit vector operation device.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Electronic systems often include a number of processing resources (e.g., one or more processors), which may retrieve and execute instructions and store the results of the executed instructions to a suitable location. A processor can comprise a number of functional units (e.g., herein referred to as functional unit circuitry such as arithmetic logic unit (ALU) circuitry, floating point unit (FPU) circuitry, and/or a combinatorial logic block, for example, which can execute instructions to perform logical operations such as AND, OR, NOT, NAND, NOR, and XOR logical operations on data (e.g., one or more operands).

A number of components in an electronic system may be involved in providing instructions to the functional unit circuitry for execution. The instructions may be generated, for instance, by a processing resource such as a controller and/or host processor. Data (e.g., the operands on which the instructions will be executed to perform the logical operations) may be stored in a memory array that is accessible by the functional unit circuitry. The instructions and/or data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the operations and/or data may also be sequenced and/or buffered.

In many instances, the processing resources (e.g., processor and/or associated functional unit circuitry) may be external to the memory array, and data can be accessed via a bus between the processing resources and the memory array to execute instructions. Data can be moved from the memory array to devices external to the memory array via a bus.

DETAILED DESCRIPTION

Figure 1A:
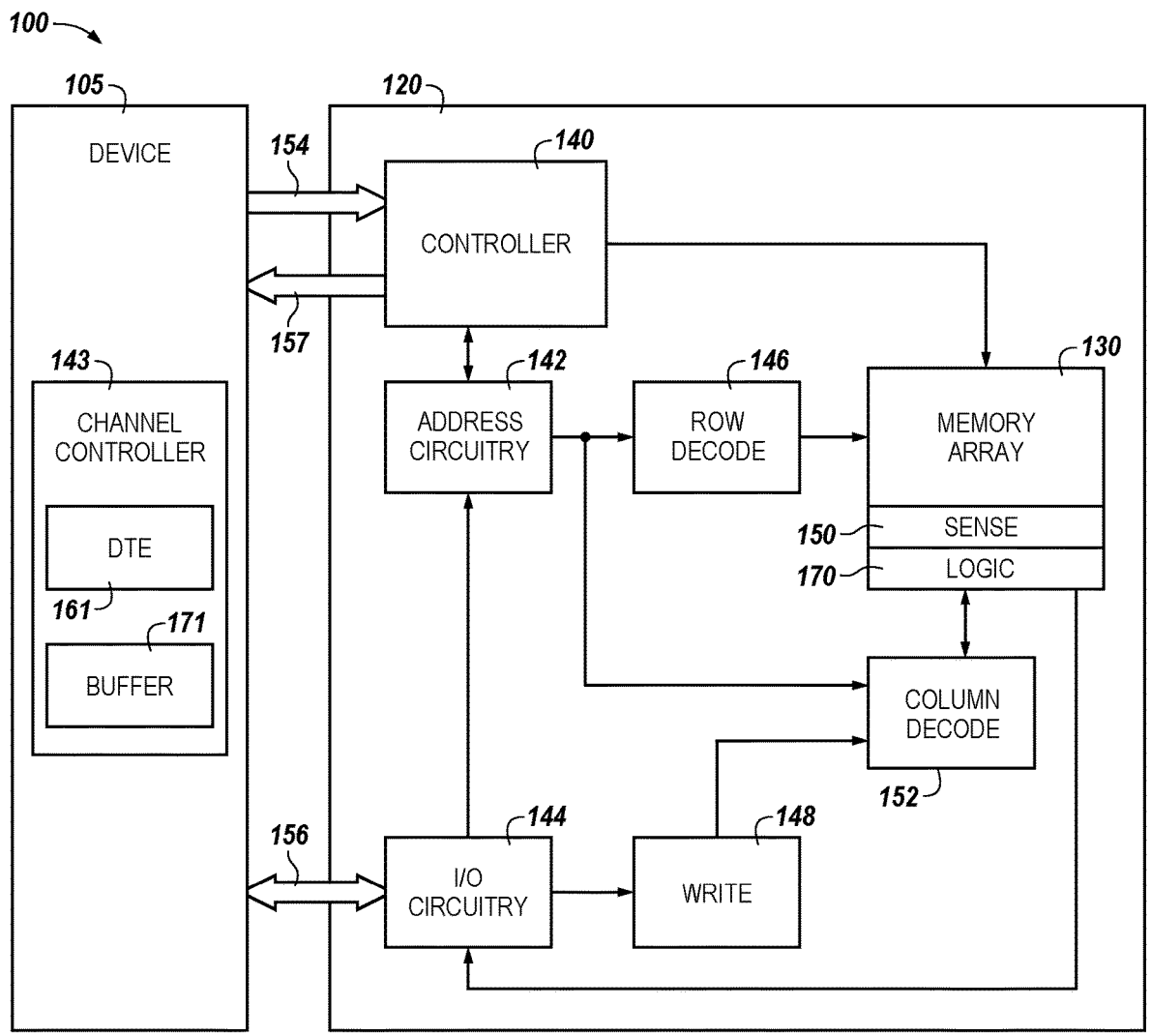
FIG. 1A is a block diagram of an apparatus in the form of a system including a device coupled to a memory device in accordance with a number of embodiments of the present disclosure.

Examples of the present disclosure provide apparatuses and methods for direct data transfer. An example of a method comprises transferring data between a first device and a second device, wherein the first device is a bit vector operation device, and transforming the data using a data transform engine (DTE) by rearranging the data to enable the data to be stored on the first device when transferring the data between the second device and first memory device.

In a number of embodiments, data transfers between a memory device, such as a bit vector operation device (e.g., a processing in memory (PIM) device), and another computing device may be made directly without connecting through a separate host. As used herein a computing device is intended to include a storage device, a network device, and/or another memory device, etc. An example of a storage device may include a redundant array of inexpensive storage (RAID) device, etc. An example of a networking device may include a switch, router, etc. Direct transfer of data between a PIM device and another device can avoid the need to store intermediate copies of the data to facilitate the data transfer between the two devices, such as in the operating system cache, which can provide increases in data transfer rates.

In a number of embodiments, data can be transferred directly between a PIM device and another device, e.g., server, storage and/or network device, by including information in a data packet, e.g., in a packet header. In various embodiments the information may be in the form of an indicator, e.g., a flag, and contain information about the data and the devices that are sending/receiving the data. In one or more embodiments, an indicator (also referred to as a flag), as used herein, is intended to mean one or more bits in a data packet that are set to a particular state and readable by a data transform engine (DTE), that is logic in form of firmware (e.g., in the form of microcode instructions) and/or hardware (e.g., transistor circuitry and/or an application specific integrated circuit (ASIC)), to indicate status or other information, e.g., data size information, bit vector shape information, sending/receiving device information, etc. The information in the flag can be used by a data transform engine (DTE) to transform the data for storage on the device that is to receive the data. The flag can be detected, received and/or operated on by the DTE to transfer the associated data directly between a PIM device and another device on a connection, e.g., bus, wireless, or other network connection, etc. In various embodiments, the data may be transformed via the data transform engine during the data transfer.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" a particular thing can refer to one or more of such things (e.g., a number of memory arrays can refer to one or more memory arrays).

The figures herein follow a numbering convention in which the first digit or digits correspond to the drawing figure number and the remaining digits identify an element or component in the drawing. Similar elements or components between different figures may be identified by the use of similar digits. For example, 270 may reference element "70" in FIG. 2, and a similar element may be referenced as 370 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense FIG. 1A is a block diagram of an apparatus in the form of a computing system 100 including a memory device 120 coupled to another device 105 in accordance with a number of embodiments of the present disclosure. As mentioned above, the device 105 may include a storage device, networking device, another memory device, server, host, etc. In the example embodiment of FIG. 1A, the device 105 may include a channel controller 143 having a data transform engine (DTE) 161 and one or more local buffers 161 to store instructions and/or data. As shown in FIG. 1A, the memory device 120 may include a controller 140 coupled to an array of memory cells 130, sensing circuitry 150, logic 170, etc. As used herein, a memory device 120, controller 140, memory array 130, sensing circuitry 150, and logic circuitry 170, channel controller 143 and data transform engine (DTE) might also be separately considered an "apparatus."

System 100 includes a device 105 coupled (e.g., connected) to memory device 120 having a memory array 130. Device 105 can be a network device, storage device, another memory device and/or a host system such as a personal laptop computer, a desktop computer, a digital camera, a smart phone, or a memory card reader, among various other types of hosts. Device 105 can include a system motherboard and/or backplane and can include a number of processing resources (e.g., one or more processors, microprocessors, or some other type of controlling circuitry). Embodiments are not limited to these examples.

Figure 1B:
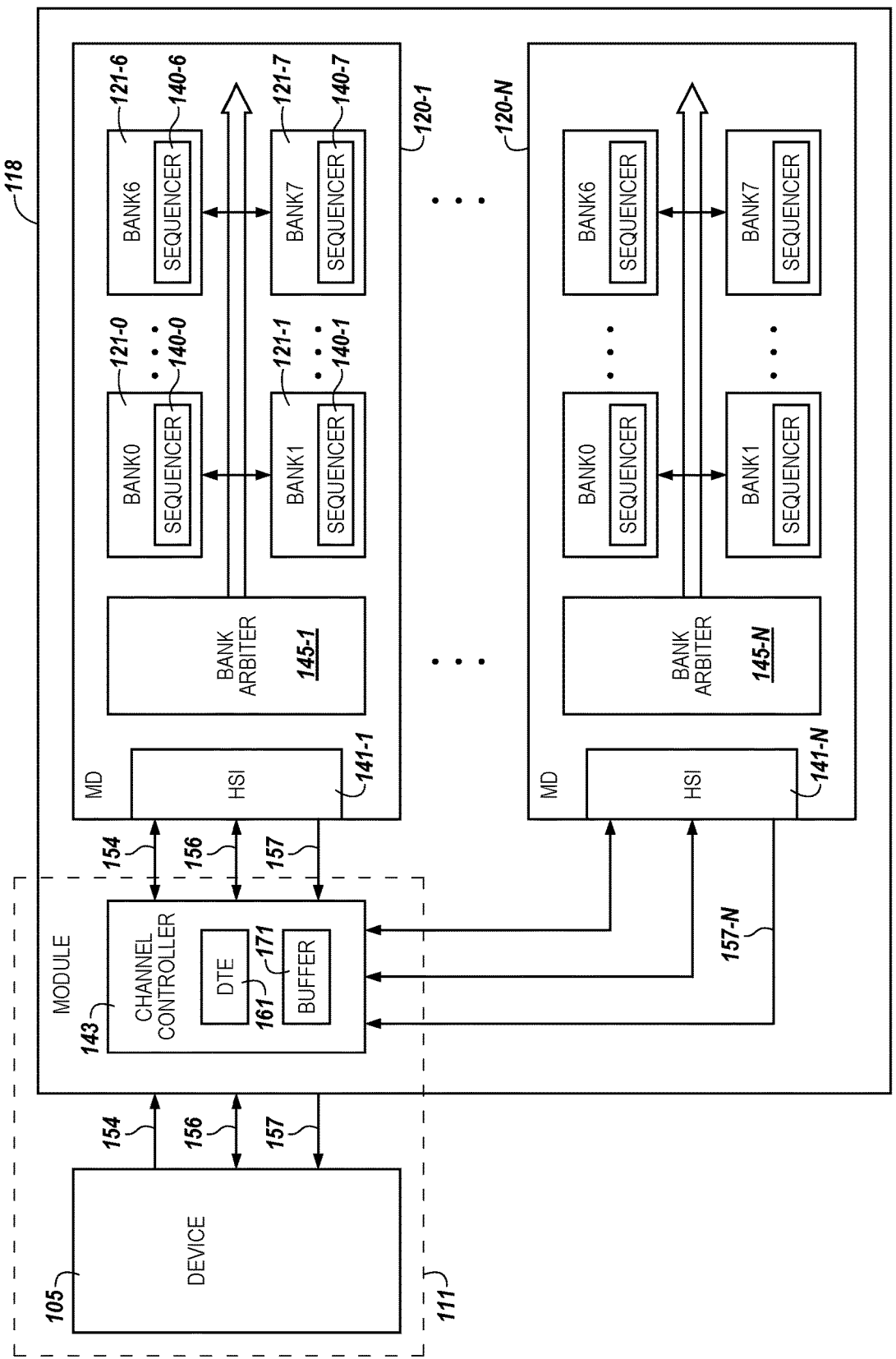
FIG. 1B is another block diagram of an apparatus in the form of a system including a device coupled to a memory device in accordance with a number of embodiments of the present disclosure.

In various embodiments, the memory device 120 can be a bit vector operation device (e.g., a processing in memory (PIM) device). The system 100 can include separate integrated circuits or both the device 105 and the memory device 120 can be on the same integrated circuit. The system 100 can be, for instance, a server system and/or a high performance computing (HPC) system and/or a portion thereof. Although the example shown in FIGS. 1A and 1B illustrates a system having a Von Neumann architecture, embodiments of the present disclosure can be implemented in non-Von Neumann architectures, which may not include one or more components (e.g., CPU, ALU, etc.) often associated with a Von Neumann architecture.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines, which may be referred to herein as data lines or digit lines. Although a single array 130 is shown in FIG. 1A, embodiments are not so limited. For instance, memory device 120 may include a number of arrays 130 (e.g., a number of banks of DRAM cells, NAND flash cells, etc.).

The memory device 120 includes address circuitry 142 to latch address signals provided over a bus 156 (e.g., an I/O bus) through I/O circuitry 144. Status and/or exception information can be provided from the memory controller 140 on the memory device 120 to a channel controller 143, including a DTE 161 on another device, through a high speed interface (HSI). The HSI may include an out-of-band bus 157. Address signals are received through address circuitry 142 and decoded by a row decoder 146 and a column decoder 152 to access the memory array 130. The address signals can also be provided to controller 140. Data can be read from memory array 130 by sensing voltage and/or current changes on the data lines using sensing circuitry 150. The sensing circuitry 150 can read and latch a page (e.g., row) of data from the memory array 130. The I/O circuitry 144 can be used for bi-directional data communication with device 105 over the data bus 156. The write circuitry 148 is used to write data to the memory array 130.

In the example embodiment of FIG. 1A, the channel controller 143 on device 105 can include a data transform engine (DTE) 161. Embodiments however are not limited to the DTE 161 being associated with the channel controller 143. For example, the data transform engine 161 can include logic in the form of firmware (e.g. microcode instructions) and/or hardware (e.g., transistor circuitry and/or one or more application specific integrated circuits (ASICs)) configured to transform (e.g., rearrange) data that is being transferred between memory device 120 and another device 105. In various embodiments, the data transform engine 161 can include a corner turn engine, an address sequencing engine, and/or a data reordering engine, among others, to transform data that is transferred between devices. Data can be transferred directly between the memory device 120 and another device 105, e.g., storage device, network device, etc., to reduce or eliminate the need of an operating system or user to make intermediate copies of the data. For example, data in a processing in memory (PIM) device may be operated upon and stored in the PIM device as a "bit vector". As used herein, the term "bit vector" is intended to mean a physically contiguous number of bits in memory, whether physically contiguous in rows (e.g., horizontally oriented) or columns (e.g., vertically oriented) in an array of memory cells (e.g., in a dynamic random access memory (DRAM) array). A bit vector can include a number elements that are each comprised of portions of the number of bits in the bit vector.

In a bit vector operation device, the bit vectors may be arranged horizontally (e.g., in rows) or vertically (e.g., in columns) contiguously with memory banks, in contrast to other memory storage which may interleave subsets of data across multiple memory banks. In various embodiments, the apparatus and methods described herein may stream data from PIM dynamic random access memory (DRAM) devices 120 to other devices 105 used for data storage, networking, streaming, etc., and vice versa. To achieve the same, the data is transformed by the data transform engine 161 so the data is in an arrangement, e.g., order, that is ready for storage in the device that is receiving the data. In this manner, DRAM use may be reduced and system performance improved. For example, data need not be copied to or from an operating system's file cache ("file buffer cache") or the operating system's network cache. Additionally, copies of the data need not be made as an intermediate step to transforming the data to or from PIM memory (e.g., vertically-stored data or horizontally-stored data).

In various embodiments, the data transform engine 161 can receive and operate on an indicator, e.g., a flag, that includes information about the data, the device that is sending the data and the device that is receiving the data. Based on the information in the flag, the data transform engine 161 can reorder the data from an order that allowed the data to be stored in the device that is sending the data to an order that will allow the device receiving the data to store the data. In this manner, the data transform engine 161 allows the data to be directly transferred between memory devices with different data formats without having to store intermediate copies of the data, such as in an operating system cache. In a number of embodiments, the direct data transfer between memory devices can be implemented as an application program interface (API).

Memory controller 140, e.g., bank control logic and/or sequencer, decodes signals provided by control bus 154 from the device 105. These signals can include chip enable signals, write enable signals, and address latch signals that are used to control operations performed on the memory array 130, including data read, data write, and data erase operations. In various embodiments, the memory controller 140 is responsible for executing instructions from the device 105 and sequencing access to the array 130. The memory controller 140 can be a state machine, a sequencer, or some other type of controller. The controller 140 can control shifting data (e.g., right or left) in an array (e.g., memory array 130), as well as corner turning data in accordance with a number of embodiments described herein.

According to various embodiments, examples of the sensing circuitry 150, shown in FIG. 1A, can comprise a number of sense amplifiers and a number of corresponding compute components, which may serve as, and be referred to herein as, accumulators and can be used to perform logical operations (e.g., on data associated with complementary data lines).

In a number of embodiments, the sensing circuitry 150 can be used to perform logical operations using data stored in array 130 as inputs and store the results of the logical operations back to the array 130 without transferring data via a sense line address access (e.g., without firing a column decode signal). As such, various compute functions can be performed using, and within, sensing circuitry 150 rather than (or in association with) being performed by processing resources external to the sensing circuitry (e.g., by a processing resource associated with a host, another device 105 and/or other processing circuitry, such as ALU circuitry, located on a controller 140 or elsewhere on the memory device 120.

In various previous approaches, data associated with an operand, for instance, would be read from memory via sensing circuitry and provided to external ALU circuitry via I/O lines (e.g., via local I/O lines and/or global I/O lines). The external ALU circuitry could include a number of registers and would perform compute functions using the operands, and the result would be transferred back to the array via the I/O lines. In contrast, in a number of embodiments of the present disclosure, sensing circuitry 150 is configured to perform logical operations on data stored in memory array 130 and store the result back to the memory array 130 without enabling an I/O line (e.g., a local I/O line) coupled to the sensing circuitry 150. The sensing circuitry 150 can be formed on pitch with the memory cells of the array. Additional logic circuitry 170 can be coupled to the sensing circuitry 150 and can be used to store, e.g., cache and/or buffer, results of operations described herein.

As such, in a number of embodiments, circuitry external to array 130 and sensing circuitry 150 is not needed to perform compute functions as the sensing circuitry 150 can perform the appropriate logical operations to perform such compute functions without the use of an external processing resource. Therefore, the sensing circuitry 150 may be used to compliment and/or to replace, at least to some extent, such an external processing resource (or at least the bandwidth consumption of such an external processing resource).

However, in a number of embodiments, the sensing circuitry 150 may be used to perform logical operations (e.g., to execute instructions) in addition to logical operations performed by an external processing resource (e.g., on a host or another device 105). For instance, a host, another device 105 and/or sensing circuitry 150 may be limited to performing only certain logical operations and/or a certain number of logical operations.

Enabling an I/O line can include enabling (e.g., turning on) a transistor having a gate coupled to a decode signal (e.g., a column decode signal) and a source/drain coupled to the I/O line. However, embodiments are not limited to not enabling an I/O line. For instance, in a number of embodiments, the sensing circuitry (e.g., 150) can be used to perform logical operations without enabling column decode lines of the array; however, the local I/O line(s) may be enabled in order to transfer a result to a suitable location other than back to the array 130 (e.g., to an external register).

FIG. 1B is a block diagram of another apparatus in the form of a computing system 100 including a plurality of memory devices 120-1, ..., 120-N coupled to another device 105 over a network such as may exist in a distributed computing system. For example, the other device 105 may be a host server, a network device, a storage device, etc. Various network links may connect the plurality of memory devices 120-1, ..., 120-N to device 105. For example, routing logic may include the cross bar switching logic to links between a device 105 and the plurality of memory devices 120-1, ..., 120-N.

In at least one embodiment a channel controller 143 may be coupled to the plurality of memory devices 120-1, ..., 120-N in an integrated manner in the form of a module 118 (e.g., formed on same chip with the plurality of memory devices 120-1, ..., 120-N). In an alternative embodiment, the channel controller 143 may be integrated with the device 105, as illustrated by dashed lines 111 (e.g., formed on a separate chip from the plurality of memory devices 120-1, ..., 120-N).

In some embodiments, the channel controller 143 can be coupled to each of the plurality of memory devices 120-1, ..., 120-N via a control bus 154 as described in FIG.

1A which in turn can be coupled to the device 105. The channel controller 143 can also be coupled to each of the plurality of memory devices, 120-1, . . . , 120-N via a data bus 156 as described in FIG. 1A, which in turn can be coupled to the device 105. In addition, the channel controller 143 can be coupled to each of the plurality of memory devices 120-1, . . . , 120-N via an out-of-band (OOB) bus 157 associated with a high speed interface (HSI) 141 that is configured to report status, exception, and other information, e.g., data, to the channel controller 143 to exchange with the device 105.

In the example embodiment of FIG. 1B, a channel controller 143 a data transform engine (DTE), and buffer 171 are shown on the module 118. According to embodiments, the data transform engine 161 is be used to transform data transferred between a number of the memory devices 120-1, . . . 120-N and another device 105.

As shown in FIG. 1B, the channel controller 143 and DTE 161 may be coupled to a high speed interface (HSI) 141 associated with a bank arbiter 145 in each of the plurality of memory devices 120-1, . . . , 120-N. In the example of FIG. 1B, each of the plurality of memory devices 120-1, . . . , 120-N can include a bank arbiter 145 to sequence control and data with a plurality of banks (e.g., Bank zero (0) 121-0, Bank one (1) 121-1, . . . , Bank six (6) 121-6, Bank seven (7) 121-7, etc.). Each of the plurality of banks 121-0 to 121-7 (referred to generally as banks 121), can include a memory controller 140 and other components, including an array 130 of memory cells and sensing circuitry 150, peripheral logic 170, etc., as described in connection with FIG. 1A. Each of the plurality of banks 121 in the plurality of memory devices 120-1, . . . , 120-N can include circuitry as described in connection with FIG. 1A.

In various embodiments, a channel controller 143 may include one or more local buffers 171 to store program instructions and can include logic to allocate a plurality of locations (e.g., subarrays), in the arrays of each respective bank to store bank commands, arguments, and/or data for the various banks associated with operation of each of the plurality of memory devices 120-1, . . . , 120-N. A channel controller 143 may dispatch commands to the plurality of memory devices 120-1, . . . , 120-N to store program instructions and/or data within a given bank of a memory device.

As in FIG. 1A, a controller 140 (e.g., bank control logic and/or sequencer) associated with any particular bank 121 in a given memory device, 120-1, . . . , 120-N, can decode signals provided by control bus 154 from a host or other device 105. These signals can include chip enable signals, write enable signals, and address latch signals that are used to control operations performed on the memory array 130, including data read, data write, and data erase operations. In various embodiments, a controller 140 may be responsible for executing instructions from a host or other device 105. According to embodiments, a controller 140 may be a state machine, a sequencer, or some other type of controller. As such, the controller 140 may control shifting data (e.g., right or left) in an array, e.g., memory array 130, and/or sequencing logical Boolean operations on a processing in memory (PIM) device 120.

Figure 2:
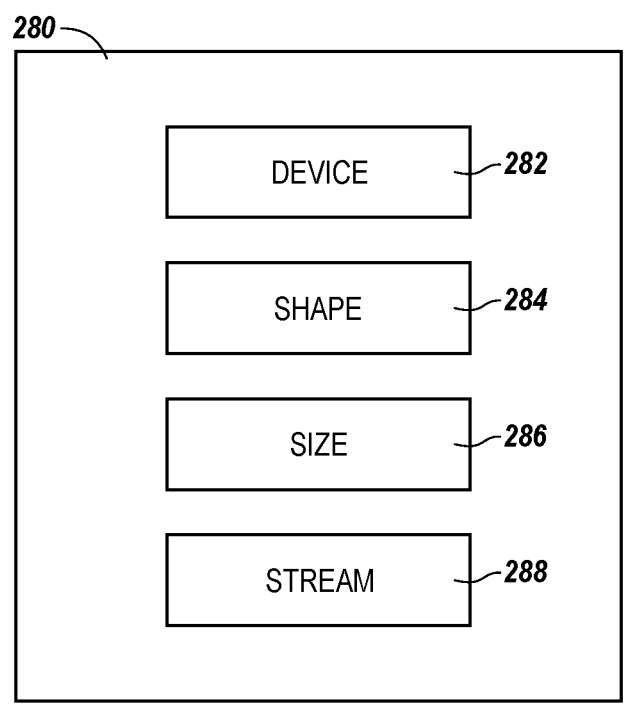
FIG. 2 is a block diagram illustrating information contained in data packet exchanged between devices in accordance with a number of embodiments of the present disclosure.

FIG. 2 is a block diagram of an indicator 280, e.g., flag, which may be received and operated on by a data transform engine (DTE) such as shown in FIGS. 1A and 1B. As noted above, the indicator 280, e.g., flag, can be information in the form of one or more bits set to a particular state and contained within a particular portion, e.g., field, of a data packet. In accordance with a number of embodiments of the present disclosure the information contained in the indicator 280 can include device information 282, data shape information 284, data size information 286, and device source/destination stream information 288. For example, the information in the indicator 280 can be include flags that are transferred with data packets between a PIM memory device, e.g., 120, and another memory, network, storage, and/or host device, e.g., 105, as shown in FIGS. 1A and 1B.

In various embodiments, the device information 282 can identify the type and characteristics of the bit vector operation device (e.g., PIM device) and/or other device (e.g., the sending and/or receiving device). The shape information 284 may identify how a given device (e.g., PIM device) stores the data. For example, a PIM device can store data in horizontal bit vectors, vertical bit vectors, diagonal bit vectors, and/or in combinations of these vectors. Thus, as used herein, the "shape" to a bit vector is intended to mean information that represents an extent of vertical and/or horizontal orientation to a bit vector's storage in a PIM device. The size information 286 may identify a bit length. For example, the size information 286 may be the number of contiguous bits, to one or more bit vectors in a PIM device, e.g., how many bits are stored in a bit vector. The stream information 288 may identify a direction indicating which data is being transferred to and/or from, e.g., from a storage, network, host, etc. device to a PIM device or vice versa. Thus, according to embodiments, the indicator 280 may be operated on by logic of the DTE to arrange data in a data transfer between a storage, network, host or other memory device, etc., and a PIM device. For example, the data transform engine can use the information in indicator 280 to transform the data for storage in a PIM device from a storage, network, or other connected device.

In some embodiments of operation, the apparatus and methods described herein may involve specifying a "shape" of the data, e.g., bit vector shape, as it will be stored in a PIM device. For example, a user may specify a "shape" indicating that the data be stored vertically in some number of contiguous bits per column of a PIM DRAM device. Embodiments are not limited to this example. This specification can aid the user in accessing the data in the PIM DRAM by providing a well-defined organization of the data. Additionally, such a specified shape may be used by another device, e.g., 105, in association with the DTE to receive data from the PIM DRAM and to identify the orientation of the data in the PIM DRAM. For example, using the apparatus and methods described herein can allow data to be transferred via a network connection directly to/from PIM devices with storage arranged horizontally or vertically.

According to various embodiments, the apparatus and methods described herein may be exposed for software (e.g., machine/computer executable instructions) use as an application program interface (API) via a shared library, e.g., a dynamically-loaded kernel module (DLKM), etc. It is noted that as used herein the term "engine" is intended to mean hardware and/or software, but at least hardware in form of logic implemented as transistor circuitry and/or one or more application specific integrated circuits (ASICs). The term "module" as used here is intended to mean software and/or hardware, but at least software in the form of machine/computer executable instructions executable by a processing resource.

In one or more embodiments, an API can allow a user and/or system to retrieve and/or send data to/from another device 105, e.g., storage device, network device, etc., directly from a PIM device, e.g., 120. For example, a user may specify an indicator 280, e.g., one or more flags, to various input/output (I/O) interfaces such as Linux open( ) and fcntl( ). Subsequent I/O operations such as read( ) or write( ) will access data directly from a device 105 and allocate it in user-specified PIM devices 120. Advantageously, in this manner the apparatus and methods described herein can allow for an operating system's file system buffer cache to be bypassed and may beneficially avoid memory to memory copies.

In an example implementation, the apparatus and methods may be exposed to software through the following API structures. One example may use a particular indicator 280, e.g., flag, enabled by a DLKM or otherwise, associated to Linux open( ) or fcntl( ) system calls. Another example may use an API provided as a shared or archive software library. In this example, the API may accept a shape indication, e.g. definition, associated with the storage used by a PIM DRAM. The API may additionally accept information in the indicator 280 as to the device 282, the size 286 and the stream 288 information, as described herein. Still another example may use a combination of the above with buffers allocated to accept memory in PIM device storage (e.g., vertical and/or horizontal).

By way of example, and not by way of limitation, an API for use with the apparatus and methods described herein may include mcs_fread (pim_vert *ptr, pim_shape *shape, size_t, nelements, pim_file *stream). In this example "ptr" can represent an address of PIM memory storage in a PIM device 120, e.g., vertically aligned. "Shape" may be information on an extent of vertical and/or horizontal orientation to the data as stored in a PIM device, e.g., a definition to a bit vector element being transferred. Further, "nelements" may represent the number of elements to be transferred, with size information being additionally included in the "shape" information. Finally, in this example, "stream" may be information on the device type and/or characteristics where the data is being transferred to or from. Embodiments, however, are not limited to this example.

Figure 3A:
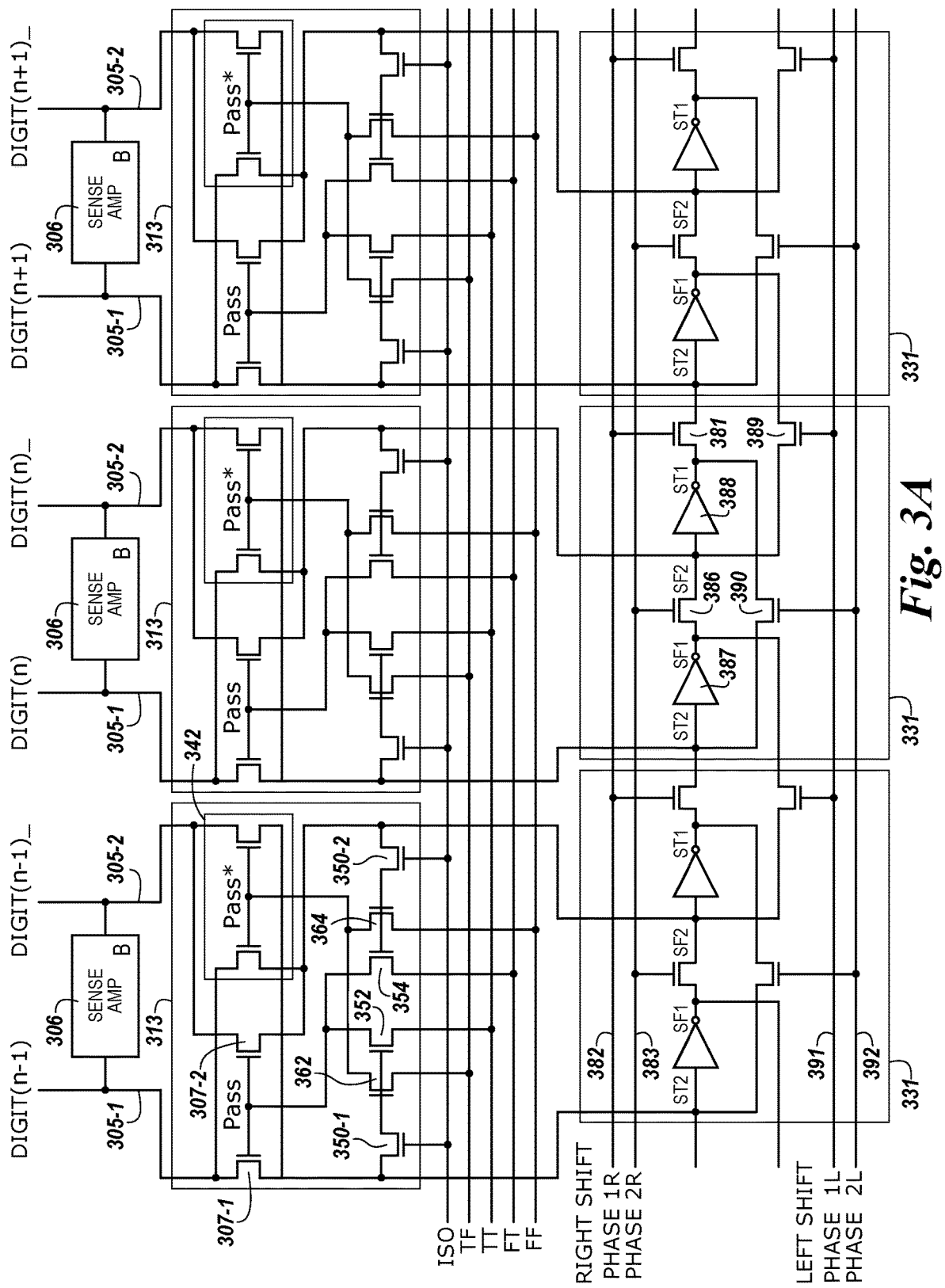
FIGS. 3A-3B are schematic diagrams illustrating sensing circuitry in accordance with a number of embodiments of the present disclosure.

FIG. 3A is a schematic diagram illustrating sensing circuitry capable of implementing a number of logical operations in accordance with a number of embodiments of the present disclosure. FIG. 3A shows a number of sense amplifiers 306 coupled to respective pairs of complementary sense lines 305-1 and 305-2, and a corresponding number of compute components 331 coupled to the sense amplifiers 306 via pass gates 307-1 and 307-2. The sense amplifiers 306 and compute components 331 shown in FIG. 3A can correspond to sensing circuitry 150 shown in FIG. 1, for example. The sensing circuitry shown in FIG. 3A includes logical operation selection logic 313, which can be operated as described further below.

Although not shown, memory cells are coupled to the pairs of complementary sense lines 305-1 and 305-2 (e.g., columns). The memory cells can be, for example, 1T1C DRAM cells each comprising a storage element (e.g., capacitor) and an access device (e.g., transistor). For example, a memory cell can comprise a transistor and a capacitor. In a number of embodiments, the memory cells may be destructive read memory cells (e.g., reading the data stored in the cell destroys the data such that the data originally stored in the cell is refreshed after being read). The cells of the memory array can be arranged in rows coupled by word lines and columns coupled by pairs of complementary data lines DIGIT(n−1)/DIGIT(n−1)_, DIGIT(n)/DIGIT(n)_, DIGIT(n+1)/DIGIT(n+1)_. The individual data lines corresponding to each pair of complementary data lines can also be referred to as data lines 305-1 (D) and 305-2 (D_) respectively. Although only three pairs of complementary data lines (e.g., three columns) are shown in FIG. 3A, embodiments of the present disclosure are not so limited, and an array of memory cells can include additional columns of memory cells and/or data lines (e.g., 4,096, 8,192, 16,384, etc.).

Memory cells can be coupled to different data lines and/or word lines. For example, a first source/drain region of an access transistor of a memory cell can be coupled to a data line 305-1 (D), a second source/drain region of the access transistor of the memory cell can be coupled to a capacitor of the memory cell, and a gate of the access transistor of the memory cell can be coupled to a word line of the memory array.

As shown in FIG. 3A, the sensing circuitry can comprise a sense amplifier 306, a compute component 331, and logical operation selection logic 313 corresponding to respective columns of memory cells (e.g., coupled to respective pairs of complementary data lines). The sense amplifier 306 can comprise, for example, a cross coupled latch, which can be referred to herein as a primary latch. The sense amplifiers 306 can be configured, for example, as described with respect to FIG. 3B.

In the example illustrated in FIG. 3A, the circuitry corresponding to compute components 331 is configured as a loadable shift register. For instance, each compute component 331 comprises a latch, which may be referred to herein as a secondary latch, and an additional number of transistors operable to transfer (e.g., shift) data values right and/or left (e.g., to a latch of an adjacent compute component 331). As described further herein, in a number of embodiments, the latch of the compute component 331 can serve as an accumulator. As such, the compute component 331 can operate as and/or may be referred to herein as an accumulator.

The gates of the pass gates 307-1 and 307-2 can be controlled by a logical operation selection logic signal, Pass. For example, an output of the logical operation selection logic 313 can be coupled to the gates of the pass gates 307-1 and 307-2, as shown in FIG. 3A.

The sensing circuitry shown in FIG. 3A also shows logical operation selection logic 313 coupled to a number of logic selection control input control lines, including ISO, TF, TT, FT, and FF. Selection of a logical operation from a plurality of logical operations is determined from the condition of logic selection control signals on the logic selection control input control lines, as well as the data values present on the pairs of complementary sense lines 305-1 and 305-2 when the isolation transistors (e.g., 350-1 and 350-2) are enabled via the ISO control signal being asserted.

According to various embodiments, the logical operation selection logic 313 can include four logic selection transistors: logic selection transistor 362 coupled between the gates of the swap transistors 342 and a TF signal control line, logic selection transistor 352 coupled between the gates of the pass gates 307-1 and 307-2 and a TT signal control line, logic selection transistor 354 coupled between the gates of the pass gates 307-1 and 307-2 and a FT signal control line, and logic selection transistor 364 coupled between the gates of the swap transistors 342 and a FF signal control line. Gates of logic selection transistors 362 and 352 are coupled to the true sense line through isolation transistor 350-1 (having a gate coupled to an ISO signal control line). Gates of logic selection transistors 364 and 354 are coupled to the complementary sense line through isolation transistor 350-2 (also having a gate coupled to an ISO signal control line).

Data values present on the pair of complementary sense lines 305-1 and 305-2 can be loaded into the compute component 331 via the pass gates 307-1 and 307-2. When the pass gates 307-1 and 307-2 are OPEN, data values on the pair of complementary sense lines 305-1 and 305-2 are passed to the compute component 331 and thereby loaded into the loadable shift register. The data values on the pair of complementary sense lines 305-1 and 305-2 can be the data value stored in the sense amplifier 306 when the sense amplifier is enabled (e.g., fired). The logical operation selection logic signal, Pass, is activated to OPEN (e.g., turn on) the pass gates 307-1 and 307-2.

The ISO, TF, TT, FT, and FF control signals can operate to select a logical operation to implement based on the data value ("B") in the sense amplifier 306 and the data value ("A") in the compute component 331 (e.g., as used herein, the data value stored in a latch of a sense amplifier is referred to as a "B" data value, and the data value stored in a latch of a compute component is referred to as an "A" data value). In particular, the ISO, TF, TT, FT, and FF control signals are configured to select the logical operation (e.g., function) to implement independent from the data value present on the pair of complementary sense lines 305-1 and 305-2 (although the result of the implemented logical operation can be dependent on the data value present on the pair of complementary sense lines 305-1 and 305-2. That is, the ISO, TF, TT, FT, and FF control signals select the logical operation to implement directly since the data value present on the pair of complementary sense lines 305-1 and 305-2 is not passed through logic to operate the gates of the pass gates 307-1 and 307-2.

Additionally, FIG. 3A shows swap transistors 342 configured to swap the orientation of the pair of complementary sense lines 305-1 and 305-2 between the sense amplifier 306 and the compute component 331. For instance, when the swap transistors 342 are OPEN (e.g., turned on), data values on the pair of complementary sense lines 305-1 and 305-2 on the sense amplifier 306 side of the swap transistors 342 are oppositely-coupled to the pair of complementary sense lines 305-1 and 305-2 on the compute component 331 side of the swap transistors 342, and thereby loaded into the loadable shift register of the compute component 331 in a complementary manner.

As an example, the logical operation selection logic signal Pass can be activated (e.g., high) to OPEN (e.g., turn on) the pass gates 307-1 and 307-2 when the ISO control signal line is activated and either the TT control signal is activated (e.g., high) with the data value on the true sense line being "1" or the FT control signal is activated (e.g., high) with the data value on the complement sense line being "1."

The data value on the true sense line being a "1" OPENs logic selection transistors 352 and 362. The data value on the complementary sense line being a "1" OPENs logic selection transistors 354 and 364. If the ISO control signal or either the respective TT/FT control signal or the data value on the corresponding sense line (e.g., sense line to which the gate of the particular logic selection transistor is coupled) is not high, then the pass gates 307-1 and 307-2 will not be OPENed by a particular logic selection transistor.

The logical operation selection logic signal Pass* can be activated (e.g., high) to OPEN (e.g., turn on) the swap transistors 342 when the ISO control signal line is activated and either the TF control signal is activated (e.g., high) with data value on the true sense line being "1," or the FF control signal is activated (e.g., high) with the data value on the complement sense line being "1." If either the respective control signal or the data value on the corresponding sense line (e.g., sense line to which the gate of the particular logic selection transistor is coupled) is not high, then the swap transistors 342 will not be OPENed by a particular logic selection transistor.

The sensing circuitry illustrated in FIG. 3A is configured to select one of a plurality of logical operations to implement directly from the four logic selection control signals (e.g., logical operation selection is not dependent on the data value present on the pair of complementary sense lines). Some combinations of the logic selection control signals can cause both the pass gates 307-1 and 307-2 and swap transistors 342 to be OPEN (e.g., conducting) at the same time, which shorts the pair of complementary sense lines 305-1 and 305-2 together. Although not shown in FIG. 3A, each column of memory cells can be coupled to a column decode line that can be activated to transfer, via a local I/O line, a data value from a corresponding sense amplifier 306 and/or compute component 331 to a control component external to the array such as an external processing resource (e.g., host processor and/or other functional unit circuitry). The column decode line can be coupled to a column decoder. However, as described herein, in a number of embodiments, data need not be transferred via such I/O lines to perform logical operations in accordance with embodiments of the present disclosure. In a number of embodiments, shift circuitry can be operated in conjunction with sense amplifiers 306 and compute components 331 to perform logical operations without transferring data to a control component external to the array, for instance. As used herein, transferring data, which may also be referred to as moving data is an inclusive term that can include, for example, copying data from a source location to a destination location and/or moving data from a source location to a destination location without necessarily maintaining a copy of the data at the source location.

As noted above, the compute components 331 can comprise a loadable shift register. In this example, each compute component 331 is coupled to a corresponding pair of complementary data lines 305-1/305-2, with a node ST2 being coupled to the particular data line (e.g., DIGIT(n)) communicating a "true" data value and with node SF2 being coupled to the corresponding complementary data line (e.g., DIGIT(n)_) communicating the complementary data value (e.g., "false" data value).

In this example, the loadable shift register comprises a first right-shift transistor 381 of a particular compute component 331 having a gate coupled to a first right-shift control line 382 (e.g., PHASE 1R), and a second right-shift transistor 386 of the particular compute component 331 having a gate coupled to a second right-shift control line 383 (e.g., PHASE 2R). Node ST2 of the particular control component is coupled to an input of a first inverter 387, whose output (e.g., node SF1) is coupled to a first source/drain region of transistor 386. The second source/drain region of transistor 386 is coupled to the input (e.g., node SF2) of a second inverter 388. The output (e.g., node ST1) of inverter 388 is coupled to a first source/drain region of transistor 381, and a second source/drain region of transistor 381 the particular compute component 331 is coupled to an input (e.g., node ST2) of a first inverter 387 of an adjacent compute component 331. The loadable shift register shown in FIG. 3A includes a first left-shift transistor 389 coupled between node SF2 of a particular compute component and node SF1 of an adjacent compute component 331. The loadable shift register shown in FIG. 3A also includes a second left-shift transistor 390 of a particular compute component 331 having a first source/drain region coupled to node ST2 and a second source/drain region coupled to node ST1. The gate of the first left-shift transistor 389 is coupled to a first left-shift control line 391 (e.g., PHASE 1L), and the gate of the second left-shift transistor 390 is coupled to a second left-shift control line 492 (e.g., PHASE 2L).

In operation, a data value on a pair of complementary data lines (e.g., 305-1/305-2) can be loaded into a corresponding compute component 331 (e.g., by operating logical operation selection logic as described above). As an example, a data value can be loaded into a compute component 331 via overwriting of the data value currently stored in the compute component 331 with the data value stored in the corresponding sense amplifier 306. Alternatively, a data value may be loaded into a compute component by deactivating the control lines 382, 383, 391, and 392.

Once a data value is loaded into a compute component 331, the "true" data value is separated from the complement data value by the first inverter 387. Shifting data to the right (e.g., to an adjacent compute component 331) can include alternating operation of the first right-shift transistor 381 and the second right-shift transistor 386, for example, via the PHASE 1R and PHASE 2R control signals being periodic signals that go high out of phase from one another (e.g., non-overlapping alternating square waves 180 out of phase). The transistor 390 can be turned on to latch the shifted data value.

An example of shifting data left via the shift register shown in FIG. 3A can include operating control signals 391 and 392 to move a data value one control component to the left through transistors 389 and 390. Data from node ST2 is inverted through inverter 387 to node SF1. Activation of control signal 391 causes the data from node SF1 to move left through transistor 389 to node SF2 of a left-adjacent compute component 331. Data from node SF2 is inverted through inverter 388 to node ST1. Subsequent activation of control signal 392 causes the data from node ST1 to move through transistor 390 left to node ST2, which completes a left shift by one compute component 331. Data can be "bubbled" to the left by repeating the left shift sequence multiple times. Data values can be latched (and prevented from being further shifted) by maintaining the control signal 392 activated.

Embodiments of the present disclosure are not limited to the shifting capability described in association with the compute components 331. For example, a number of embodiments and include shift circuitry in addition to and/or instead of the shift circuitry described in association with a loadable shift register.

The sensing circuitry in FIG. 3A can be operated in several modes to perform logical operations, including a first mode in which a result of the logical operation is initially stored in the sense amplifier 306, and a second mode in which a result of the logical operation is initially stored in the compute component 331. Additionally with respect to the first operating mode, sensing circuitry can be operated in both pre-sensing (e.g., sense amplifiers fired before logical operation control signal active) and post-sensing (e.g., sense amplifiers fired after logical operation control signal active) modes with a result of a logical operation being initially stored in the sense amplifier 306.

In a number of examples, the sense amplifier 306 and the compute component 331 can be in at least one of two states associated with the first mode and the second mode. As used herein, a state of a sense amplifier 306 and/or the compute component 331 describes a transfer of data between the sense amplifier 306 and/or the compute component 331. The state of the sense amplifier 306 and the compute component 331 can also be described as the state of a sensing component. The state of a sensing component can be based on whether the sense amplifier 306 is in an equilibration state or is storing a data value (e.g., logic "0" or logic "1"). That is, a sense amplifier can be configured to be in an initial state, wherein the initial state is one of an equilibration state and a data storage state. An equilibration state includes the sense amplifier 306 being in an equilibration state. A data storage state includes the sense amplifiers 306 storing a data value. As used herein, a data value can be referred to as a bit and/or a digit value. Data can be transferred from a compute component 331 to a sense amplifier 306 in response to enabling a pass gate (e.g., activating the PASS and/or PASS* control signals via the TF 362, TT 352, FT 354, and/or FF 364 control signals that are referred to herein as a logical operation selection logic) and the sense amplifier 306 being in a equilibration state. Data can be transferred from a sense amplifier 306 to a compute component 331 in response to enabling the pass gate (e.g., activating the PASS and/or PASS* control signals via the TF 362, TT 352, FT 354, and/or FF 364 control signals that are referred to herein as a logical operation selection logic) and the sense amplifier 306 being in a data storage state. The direction of the transfer of data between the sense amplifier 306 and the compute component 331 is determined by whether the sense amplifier 306 is in an equilibration state or stores a data value before the PASS and/or PASS* control signals are activated and by a particular operation selected via the logical operation selection logic (e.g., TF 362, TT 352, FT 354, and FF 364 control signals).

For example, if the sense amplifier 306 is equilibrated and the PASS and/or PASS* control signals are activated to provide a conduction path (e.g., electrical continuity) between the sense amplifier 306 and the compute component 331, then a data value stored in the compute component 331 can be transferred from the compute component 331 to the sense amplifier 306.

If the sense amplifier 306 is configured to store a first bit (e.g., first data value) and the PASS and/or PASS* control signals are activated to provide a conduction path between the sense amplifier 306 and the compute component 331, then a second bit (e.g., second data value) that is stored in the compute component 331 before the activation of the PASS and/or PASS* control signals can be replaced by the first bit and the sense amplifier 306 retains the first bit. Furthermore, a number of operations can be performed using the first bit and the second bit using the logical operation selection logic and the result of the operation can be stored in the compute component 331.

Using an equilibration signal to direct the transfer of data between the sense amplifier 306 and the compute component 331 can provide the ability to selectively perform an operation in sense amplifiers that are not equilibrated without performing the operation in sense amplifiers that are equilibrated. That is, a PASS and/or a PASS* control signal can be activated in a plurality of sensing components to move data between a first group of a plurality of sense amplifiers that are equilibrated and a first group of a plurality of compute components. The PASS and/or PASS* control signals can also be activated to move data between a second group of the plurality of sense amplifiers and a second group of the plurality of component components that are not equilibrated to selectively perform an operation in a second group of sense components while not performing the operation on a first group of sense components.

Figure 3B:
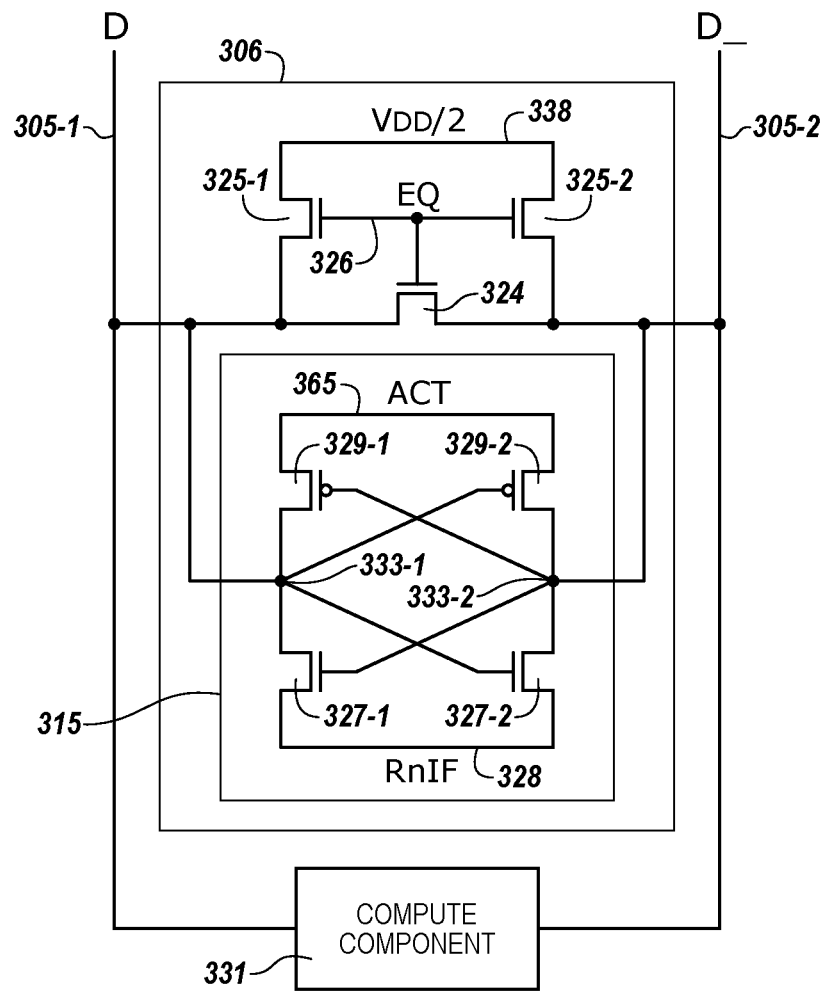

FIG. 3B illustrates a schematic diagram of a portion of sensing circuitry in accordance with a number of embodiments of the present disclosure. According to various embodiments, sense amplifier 306 can comprise a cross coupled latch. However, embodiments of the sense amplifier 306 are not limited to a cross coupled latch. As an example, the sense amplifier 306 in FIG. 3B can be current-mode sense amplifier and/or single-ended sense amplifier (e.g., sense amplifier coupled to one data line). Also, embodiments of the present disclosure are not limited to a folded data line architecture.

In a number of embodiments, a sense amplifier (e.g., 306) can comprise a number of transistors formed on pitch with the transistors of the corresponding compute component 331 and/or the memory cells of an array (e.g., 330 shown in FIG. 3A) to which they are coupled, which may conform to a particular feature size (e.g., $4F^2$, $6F^2$, etc.). Sense amplifier 306 comprises a latch 315 including four transistors coupled to a pair of complementary data lines D 305-1 and D_ 305-2. The latch 315 can be a cross coupled latch. That is, the gates of a pair of transistors, such as n-channel transistors (e.g., NMOS transistors) 327-1 and 327-2 are cross coupled with the gates of another pair of transistors, such as p-channel transistors (e.g., PMOS transistors) 329-1 and 329-2. As described further herein, the latch 315 comprising transistors 327-1, 327-2, 329-1, and 329-2 can be referred to as a primary latch. However, embodiments are not limited to this example.

The voltages or currents on the respective data lines D and D_ can be provided to the respective latch inputs 333-1 and 333-2 of the cross coupled latch 315 (e.g., the input of the primary latch). In this example, the latch input 333-1 is coupled to a first source/drain region of transistors 327-1 and 329-1 as well as to the gates of transistors 327-2 and 329-2. Similarly, the latch input 333-2 can be coupled to a first source/drain region of transistors 327-2 and 329-2 as well as to the gates of transistors 327-1 and 329-1. The compute component 331, which may be referred to herein as an accumulator, can be coupled to latch inputs 333-1 and 333-2 of the cross coupled latch 315 as shown; however, embodiments are not limited to the example shown in FIG. 3B.

In this example, a second source/drain region of transistor 327-1 and 327-2 is commonly coupled to an RnIF 328. A second source/drain region of transistors 329-1 and 329-2 is commonly coupled to an ACT signal 365. The ACT signal 365 can be a supply voltage (e.g., $V_{DD}$) and the RnIF signal can be a reference voltage (e.g., ground). Activating signals 328 and 365 enables the cross coupled latch 315.

The enabled cross coupled latch 315 operates to amplify a differential voltage between latch input 333-1 (e.g., first common node) and latch input 333-2 (e.g., second common node) such that latch input 333-1 is driven to one of the ACT signal voltage and the RnIF signal voltage (e.g., to one of $V_{DD}$ and ground), and latch input 333-2 is driven to the other of the ACT signal voltage and the RnIF signal voltage.

The sense amplifier 306 can also include circuitry configured to equilibrate the data lines D and D_ (e.g., in association with preparing the sense amplifier for a sensing operation). In this example, the equilibration circuitry comprises a transistor 324 having a first source/drain region coupled to a first source/drain region of transistor 325-1 and data line D 305-1. A second source/drain region of transistor 324 can be coupled to a first source/drain region of transistor 325-2 and data line D_ 305-2. A gate of transistor 324 can be coupled to gates of transistors 325-1 and 325-2.

The second source drain regions of transistors 325-1 and 325-2 are coupled to an equilibration voltage 338 (e.g., $V_{DD}/2$), which can be equal to $V_{DD}/2$, where $V_{DD}$ is a supply voltage associated with the array. The gates of transistors 324, 325-1, and 325-2 can be coupled to control signal 326 (EQ). As such, activating EQ enables the transistors 324, 325-1, and 325-2, which effectively shorts data line D to data line D_ such that the data lines D and D_ are equilibrated to equilibration voltage $V_{DD}/2$. According to a number of embodiments of the present disclosure, a number of logical operations can be performed using the sense amplifier 306 and compute component 331, and the result can be stored in the sense amplifier and/or compute component.

The sensing circuitry 350-2 in FIG. 3A can be operated in several modes to perform logical operations, including a first mode in which a result of the logical operation is initially stored in the sense amplifier 306, and a second mode in which a result of the logical operation is initially stored in the compute component 331. Additionally with respect to the first operating mode, sensing circuitry 350-2 can be operated in both pre-sensing (e.g., sense amplifiers fired before logical operation control signal active) and post-sensing (e.g., sense amplifiers fired after logical operation control signal active) modes with a result of a logical operation being initially stored in the sense amplifier 306.

As described further below, the sense amplifier 306 can, in conjunction with the compute component 331, be operated to perform various logical operations using data from an array as input. In a number of embodiments, the result of a logical operation can be stored back to the array without transferring the data via a data line address access (e.g., without firing a column decode signal such that data is transferred to circuitry external to the array and sensing circuitry via local I/O lines). As such, a number of embodiments of the present disclosure can enable performing various operations (e.g., logical operations, mathematical operations, etc.) using less power than various previous approaches. Additionally, since a number of embodiments eliminate the need to transfer data across I/O lines in order to perform operations (e.g., between memory and discrete processor), a number of embodiments can enable an increased parallel processing capability as compared to previous approaches.

Figure 4:
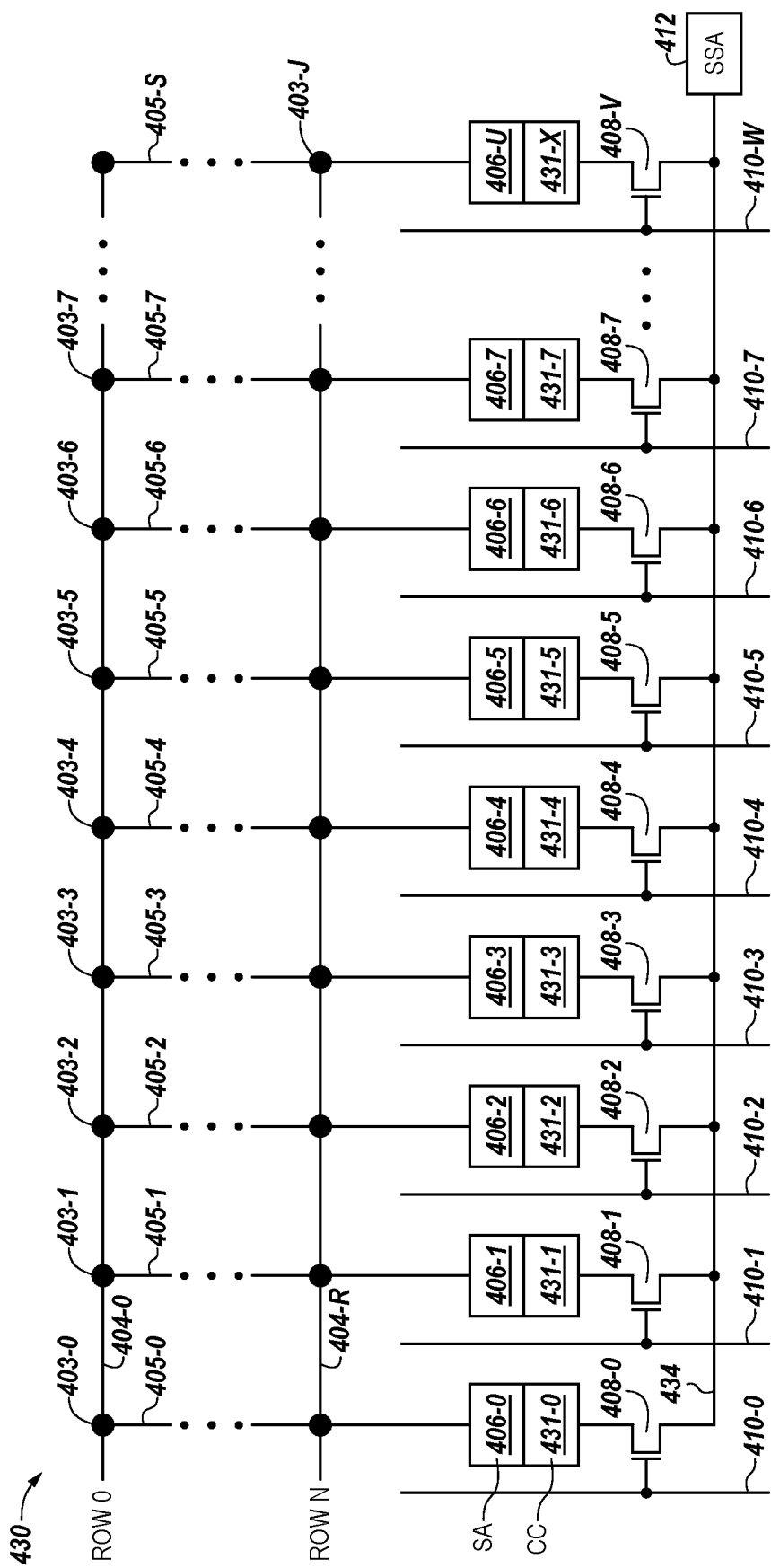
FIG. 4 illustrates a schematic diagram of a portion of a memory array in accordance with a number of embodiments of the present disclosure.

FIG. 4 illustrates a schematic diagram of a portion of a memory array 430 in accordance with a number of embodiments of the present disclosure. The array 430 includes memory cells (referred to generally as memory cells 403, and more specifically as 403-0 to 403-J) coupled to rows of access lines 404-0, . . . , 404-R and columns of sense lines 405-0, 405-1, 405-2, 405-3, 405-4, 405-5, 405-6, 405-7, . . . , 405-S. Memory array 430 is not limited to a particular number of access lines and/or sense lines, and use of the terms "rows" and "columns" does not intend a particular physical structure and/or orientation of the access lines and/or sense lines. Although not pictured, each column of memory cells can be associated with a corresponding pair of complementary sense lines (e.g., complementary sense lines 205-1 and 205-2 in FIG. 2A).

Each column of memory cells can be coupled to sensing circuitry (e.g., sensing circuitry 150 shown in FIG. 1). In this example, the sensing circuitry comprises a number of sense amplifiers 406-0, 406-1, 406-2, 406-3, 406-4, 406-5, 406-6, 406-7, . . . , 406-U (refereed generally as sense amplifiers 406) coupled to the respective sense lines 405-0, 405-1, 405-2, 405-3, 405-4, 405-5, 405-6, 405-7, . . . , 405-S. The sense amplifiers 406 are coupled to input/output (I/O) line 434 (e.g., a local I/O line) via access devices (e.g., transistors) 408-0, 408-1, 408-2, 408-3, 408-4, 408-5, 408-6, 408-7, . . . , 408-V. In this example, the sensing circuitry also comprises a number of compute components 431-0, 431-1, 431-2, 431-3, 431-4, 431-5, 431-6, 431-7, . . . , 431-X (referred to generally as compute components 431) coupled to the respective sense lines. Column decode lines 410-1 to 410-W are coupled to the gates of transistors 408-1 to 408-V, respectively, and can be selectively activated to transfer data sensed by respective sense amps 406-0 to 406-U and/or stored in respective compute components 431-0 to 431-X to a secondary sense amplifier 412. In a number of embodiments, the compute components 431 can be formed on pitch with the memory cells of their corresponding columns and/or with the corresponding sense amplifiers 406. In this way, in an array comprising 16K columns, 16K vertically stored data elements could be processed in parallel by the corresponding 16K 1-bit processors. That is, each column can process 1-bit information in parallel.

The memory cells 403 can store a number of bit vectors. For example, memory cells 403 that are couple to a particular sense line 405 can store vertical bit vectors and/or horizontal bit vectors. For example, in FIG. 4 the memory cells that are coupled to sense line 405-0 and coupled to access lines 404-0 to 404-R can store a vertical bit vector having R+1 bits. Also, in FIG. 4 the memory cells that are coupled to access line 404-0 and sense lines 405-0 to 405-S can store a horizontal bit vector having S=1 bits. The memory cells 403 in FIG. 4 can also store bit vectors in a number of configurations, such as vertical, horizontal, diagonal, and/or combinations of vertical, horizontal, and/or diagonal (e.g., the bit vector includes portions that vertical, horizontal, and/or diagonal). The configuration in which bit vectors are stored in memory cells (e.g., vertical, horizontal, diagonal, and/or a combination of vertical, horizontal, and/or diagonal) can be the shape of the data. The shape of the data can be identified by a flag that is included with the data when transferring the data to and/or from the memory cells 403.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving at a data transform engine (DTE), first shape information indicating how data received at a bit vector operation device is stored;
   transforming data received at the bit vector operation device using the DTE by rearranging the data, such that bits of the data are in a different order from an order in which the DTE received the bits of the data and corresponding to size and second shape information associated with the bits of data and source stream information associated with the bit vector operation device; and
   storing the data as the bit vector in the bit vector operation device in an order based on the first shape information, the source stream information, the rearranged data, the size information, and the second shape information.

2. The method of claim 1, wherein transforming the data comprises transforming data received from a storage device at the bit vector operation device, wherein the bit vector operation device is a processing in memory (PIM) device.

3. The method of claim 1, wherein transforming the data comprises transforming data received from a network device at the bit vector operation device, wherein the bit vector operation device is a processing in memory (PIM) device.

4. The method of claim 1, wherein storing the data based on the first and the second shape information comprises storing the data based on information on an extent of a vertical orientation to the data as stored at the bit vector operation device, wherein the bit vector operation device is a processing in memory (PIM) device.

5. The method of claim 1, wherein storing the data based on the first and the second shape information comprises storing the data based on information on an extent of a horizontal orientation to the data as stored at the bit vector operation device, wherein the bit vector operation device is a processing in memory (PIM) device.

6. The method of claim 1, wherein storing the data based on the size information comprises storing the data based on a length of one or more bits of the bits of data.

7. The method of claim 1, wherein transforming the data using the DTE comprises rearranging the data to enable the data to be stored on the second device when transferring the data from the first device to the second device.

8. The method of claim 1, wherein transferring the data comprises bypassing an operating system cache.

9. The method of claim 1, wherein transferring the data comprises bypassing storing a copy of the data when transforming the data.

10. A method, comprising:
    receiving at a data transform engine (DTE), shape information indicating how data received at a bit vector operation device is stored;
    transforming data received at the DTE from a device in a network using the DTE by rearranging bits of the received data to store on the bit vector operation device based on a number of contiguous bits per bit vector, source stream information associated with the bit vector operation device, and a shape of bit vectors of data on the bit vector operation device;
    storing the received data as a bit vector in the bit vector operation device, wherein the bit vector operation device is a processing in memory (PIM) device, and bits of the bit vector are stored in an order based on the rearranged bits of the received data.

11. The method of claim 10, wherein transforming the received data includes rearranging bits of the received data for vertical storage in the bit vector operation device.

12. The method of claim 10, wherein transforming the received data includes rearranging bits of the received data for horizontal storage in the bit vector operation device.

13. The method of claim 10, wherein the method includes identifying size information, the shape information, source device information, and destination device information using the DTE and an indicator in a data packet associated with the received data.

14. An apparatus, comprising:
- an array of memory cells;
- a data transform engine (DTE) on a channel controller coupled to the array of memory cells, wherein the DTE is configured to:
  - receive first shape information indicating how data received at the array of memory cells is stored; and
  - transform data that is transferred from a device to the array of memory cells based on an indicator in a data packet that indicates source stream information associated with the array of memory cells and a size and a shape of bit vectors of data stored in the array of memory cells,
- wherein the DTE and the indicator identify size information, the shape information, source device information, and destination device information; and
- wherein bits of the bit vector are stored in the array of memory cells as bit vectors in an order based on the transformed data.

15. The apparatus of claim 14, further comprising sensing circuitry configured to perform a logical operation on the bit vector stored in the array of memory cells.

16. The apparatus of claim 14, wherein the array of memory cells are dynamic random access memory (DRAM) cells in a processing in memory (PIM) DRAM device.

17. The apparatus of claim 16, wherein the DTE is located on a storage device separate from the PIM DRAM device.

18. The apparatus of claim 16, wherein the DTE is associated with a controller on the PIM DRAM device.

19. The apparatus of claim 14, wherein the indicator is in a header of the data packet and indicates the size of the bit vectors as a number of contiguous bits per bit vector of data on the device.

20. The apparatus of claim 14, wherein the indicator is in a header of the data packet and indicates the shape of the bit vectors as horizontal storage or vertical storage in the bit vector operation device.

* * * * *